INVENTOR
GILBERT L. HOBROUGH
BY
Stanley Bialos
Stanley Belsky
ATTORNEYS

Feb. 25, 1969 G. L. HOBROUGH 3,429,990

SCANNING RASTER GENERATOR

Filed Sept. 4, 1964 Sheet 2 of 5

INVENTOR.
GILBERT L. HOBROUGH

BY Stanley Bialos
Stanley Belsky
ATTORNEYS

INVENTOR
GILBERT L. HOBROUGH
BY Stanley Bialos
Stanley Belsky
ATTORNEYS

SCANNING RASTER GENERATOR

Filed Sept. 4, 1964

INVENTOR.
GILBERT L. HOBROUGH

BY Stanley Bialos
Stanley Belsky
ATTORNEYS

INVENTOR.
GILBERT L. HOBROUGH
BY Stanley Bialos
Stanley Belsky
ATTORNEYS

United States Patent Office 3,429,990
Patented Feb. 25, 1969

3,429,990
SCANNING RASTER GENERATOR

Gilbert L. Hobrough, Los Altos, Calif., assignor to Itek Corporation, Lexington, Mass., a corporation of Delaware Filed Sept. 4, 1964, Ser. No. 394,424
U.S. Cl. 178—6.8 2 Claims
Int. Cl. H04n 3/00, 3/12, 3/16

ABSTRACT OF THE DISCLOSURE

This disclosure relates to a flying spot scanner for scanning an optical image upon a transparency or the like wherein a photocell optically co-acting with the transparency produces a video signal indicative of the image. This video signal is amplified and is applied to the intensity control element of a viewing cathode ray tube which in turn electronically reproduces the image scanned, usually in magnified form.

This invention relates to a scanning raster and generator therefor and, more particularly, to a scanning pattern of predetermined configuration and to a generator network operative to produce the same. Such pattern is useful in electronic reproduction and comparison of photographic images.

The registration of photographic images, whether accomplished manually or automatically, is basic to practically all photogrammetric operations. In connection with such registration of photographic images, relative distortions between a stereo pair of images are a common occurrence quite familiar to photogrammetists. Convergent and panoramic photography probably represent the most extreme cases of such distortions with convergent-panoramic stereograms providing the most severe instance thereof. As a consequence of such relative image distortions, registration of photographic images generally requires one or more image transformations (that is, a systematic operation upon an image thereby to alter its scale, orientation or over-all shape) to be made if registration of the images is to be accomplished.

One such image transformation concerns the elimination of "parallax" which may be defined as unwanted separation between corresponding points in similar images when superimposed. Registration of images having parallax necessarily includes the act of translating and orienting one or both of a pair of similar images so as to reduce all parallax to zero when the images are superimposed. Another such transformation concerns a correction for "relative distortion" which may be defined as a difference in size or shape of similar images such that a transformation of one or both images is required to achieve registration thereof.

Automatic registration instruments have been devised which electronically sense image parallaxes and automatically feed back appropriate adjustments of prime transformations to effect a condition of registration of the two images. Such instruments vary widely in the number of transformations automatically accomplished thereby, but substantially all of these instruments include an electronic-optical system for scanning the photographic images and an associated electronic-optical system for viewing the resultant output of the scanning system. Since cathode ray tubes are used in both the scanning and viewing systems, raster generators are necessarily included in such instruments to produce waveforms which, when amplified and applied to the deflection systems of the cathode ray tubes, produce the required scanning pattern or raster on the faces of such tubes.

The term "scanning pattern" refers to the shape of the path traced out by the scanning spot of the cathode ray tube as such spot moves continuously throughout the scanning area or raster. The television scanning raster is probably the most familiar pattern and has been used both for electronic viewing of photographic transparencies and for automatic plotting instruments. In a television scanning pattern the scanning spot covers each point in the photographic image only once during a complete scanning raster, and the velocity of the spot remains constant except for the brief fly-back periods at which time the spot is extinguished. These characteristics make the television pattern ideal for the presentation of images to be viewed by an operator of such plotting instruments because the velocity of the spot being constant, the entire image area appears to be of uniform brightness from edge to edge thereof.

An automatic registration instrument employing a television scanning raster could derive parallax information from the left and right video channels in a simple manner by measuring the time difference between corresponding points in these signals. If the scanning direction were arranged to be parallel to the $x$ axis, then $x$ parallaxes could be derived by this method simply and directly. Unfortunately, under these conditions it could not be possible to measure $y$ parallaxes directly since there is not a simple relationship between time and displacements in the $y$ direction. This difficulty could be overcome for some purposes by rotating the scanning raster periodically by 90°, which would then make it possible to measure $x$ and $y$ parallaxes successively but not concurrently.

Another difficulty with the television scanning raster arises out of errors introduced by any variation in the time of arrival of the video signals caused by conditions other than image parallax. One such condition may be a drift in the delay or transit time of the video signals in the video amplifiers or in other circuitry. Another such condition is the delay of the scanning signals applied to either the viewing or the scanning cathode ray tube. Either would be effective in producing an image offset indistinguishable from parallax. Scanning patterns in which the spot velocity is periodically reversed are free from errors of this type.

A random scanning pattern has qualities almost completely complementary to the characteristics of the television scanning raster. The scanning spot in the random pattern has no preferred direction of scan either vertically or horizontally and moves, for example, from left to right as frequently as it moves from right to left. These characteristics eliminate the displacement error inherent in the television scan, and also permit the detection of $x$ and $y$ parallax without periodic pattern reorientation.

However, the random scanning pattern is not suitable for the production of viewed images (i.e., viewed by an operator in contradistinction to electronically inspected images). The pattern is bright in the center, which area is frequently scanned, and becomes dimmer and irregular toward the margin owing to the relatively infrequent scanning thereat. Also, since the spot velocity is not constant but varies over wide limits, the resolution of the image is impaired in that it is made up of the superposition of high resolution elements produced when the spot is moving at low velocity and low resolution elements produced when the spot is moving at relatively high velocity.

Other scanning patterns have been proposed from time to time for use in photogrammetric image matching operations. An example thereof is the rosette patterns which is one that offers the advantage of constant spot velocity. Unfortunately, the pattern has a strong radial symmetry and, therefore, treats image detail differently depending upon where in the scanned area it may appear. Also, the rosette pattern is not suitable for image viewing since, like the random pattern, a vignetted image with a bright center is produced.

An object of the present invention is to provide a scanning pattern useful in automatic registration instruments which accommodates both of the following two functions when performed simultaneously: (1) the presentation to an operator of a high quality image in which all of the detail present in the original photographs is preserved and, where possible, made more visible; and (2) the estimation of $x$ and $y$ parallaxes by the detection of time differences between left and right video signals.

Another object of the invention is that of providing a scanning pattern wherein such functions are accommodated and which is relatively simple to produce and remains stable over long periods of time without the requirement for frequent readjustment.

Still another object is the the provision of a scanning pattern which from the standpoint of parallax detection offers the following advantages:

(a) Motion of the scanning spot in mutually perpendicular directions, thereby permitting distance measurements to be made in the image directly from time measurements and in two orthogonal axes. Consequently, $x$ and $y$ parallaxes can be detected without pattern reorientation.

(b) Scanning of each point in the image successively in four directions along two perpendicular axes so as to give four permutations of the image information and eliminate errors arising out of delay displacement.

(c) Giving equal weight to all areas in the image in the determination of parallax and maintaining the scanning velocity constant at all time without retraces. Therefore, comparatively simple correlation circuitry can serve to detect parallax and to derive therefrom the various error signals required for transformation correction of the photographic images.

(d) Production of the scanning pattern simply by application of triangular wave forms of nearly identical frequency to both the $x$ and $y$ deflection systems of the cathode ray tubes.

Yet another object is to provide a scanning pattern having crossing orthogonal sets of parallel lines, each set of lines tending to obliterate the structure of the opposite set thereby giving an image having faint woven-silk texture which is distinctly more pleasant than television-type images of equivalent resolution (it may require, however, considerably more video band-width for its production).

A further object is that of providing a crossed diagonal raster of generally square-shaped configuration in which each image element is scanned in mutually perpendicular directions by a spot traveling at substantially uniform velocity throughout the useful image area.

Yet a further object is in the provision of a raster generator network operative to produce a square-shaped diagonally oriented scanning pattern having the advantgeous characteristics described in which each scanning frame is produced in its entirety by a continuously tracing scanning spot, and comprises two interlaced fields (three or more interlaced fields can be provided if desired) to double the resolution of the video image reproduction and substantially obviate objectionable flicker thereof.

Additional objects and advantages of the invention will become apparent as the specification develops.

Embodiments of the invention are illustrated in the accompanying drawings, in which.

The desired scanning pattern, as indicated hereinbefore, is susceptible to both manual and electronic viewing of a stereo pair of photographic images, and is a dual diagonal pattern comprising a plurality of interlaced fields defining one complete frame of scanning cycle (i.e., one entire scanning pattern which is then repeated). In a particular instance which has been found satisfactory, the scanning pattern constitutes a square-shaped raster having a frame repetition rate of 30 per second with each frame comprising an interlace of two fields. Each geld is formed of substantially 205 lines to the diagonal or a total of 510 lines for a complete frame.

Figure 1:
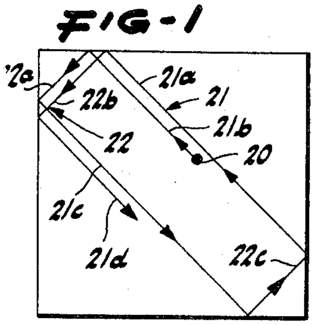
FIGURE 1 is a diagrammatic view illustrating the character of the path followed by the spot of a cathode ray tube in tracing the square-shaped dual diagonal pattern.
Figure 2:
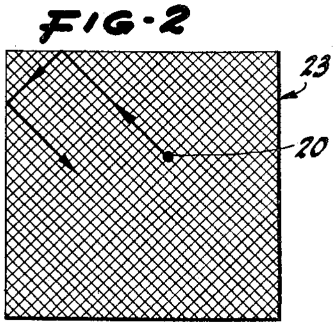
FIGURE 2 is a diagramatic view illustrating one complete field as traced by the spot.
Figure 3:
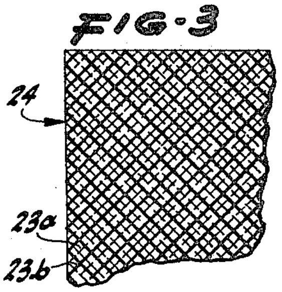
FIGURE 3 is a broken diagrammatic view illustrating one complete frame as traced by the spot, one field of the frame being shown in solid lines and the second interlaced field being shown by broken lines.
Figure 10A:
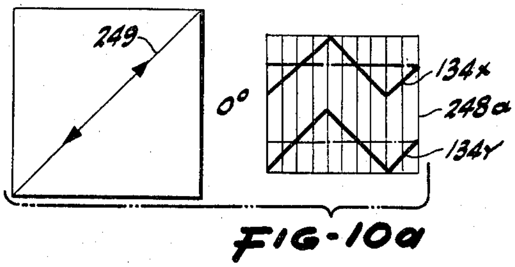
FIGURES 10*a* through 10*h* comprise a series of diagrammatic views respectively illustrating the orientation of the trace in relation to the progressive change in the phase relationship of the two time base signals derived from the circuit illustrated in FIGURE 7.
Figure 10E:
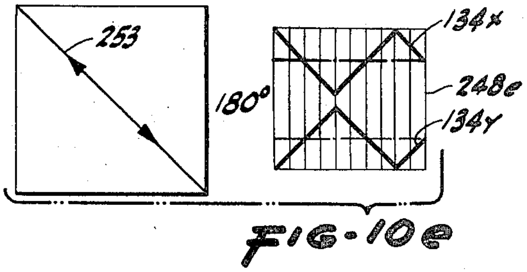
Figure 10B:
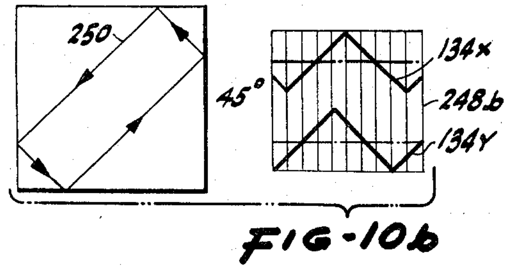
Figure 10F:
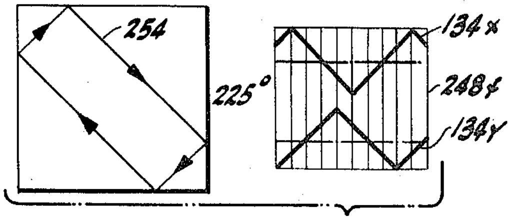
Figure 10C:
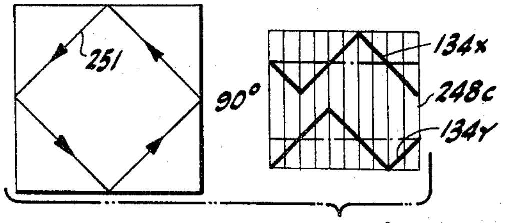
Figure 10G:
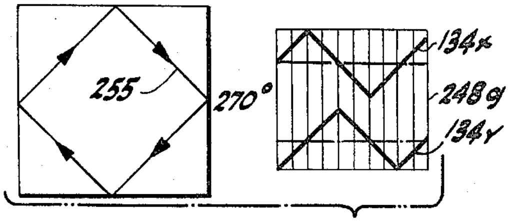
Figure 10D:
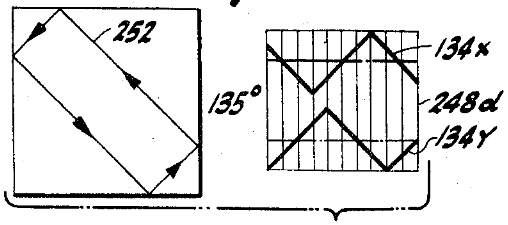
Figure 10H:
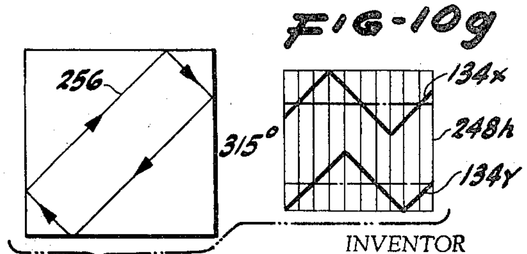

Such scanning raster is illustrated in FIGURES 1 through 3 of which FIGURE 1 denotes the path of movement of the traveling spot, FIGURE 2 illustrates one complete field (with the number of lines reduced for clarity), and FIGURE 3 depicts one complete frame comprising two interlaced fields. As indicated, each frame may comprise 510 lines in each orthogonal set of parallel lines, and the frame repetition rate may be 30 per second of the single interlace (i.e., two) fields, as shown in FIGURE 3. The traveling or moving spot that develops the trace on the face of the cathode ray tube is shown in enlarged form in FIGURES 1 and 2 and is designated for identification with the numeral 20. It is understood that the spot is developed in the conventional manner by a stream of electrons striking the coated inner face of a cathode ray tube and, therefore, the entire area enclosed within the generally square shape boundaries of FIGURES 1, 2 and 3 may be taken to be a major portion of the face of such cathode ray tube.

The spot 20 moves continuously in tracing an entire scanning pattern of one frame which comprises two interlaced fields. The general path of movement of the spot 20 is illustrated most clearly in FIGURE 1 wherein it is seen that the spot changes direction by 90° as it reaches each marginal edge of the raster. Thus, the crossing orthogonal sets of parallel lines are developed in a progression in which one line of a set is traced, the spot changes direction and the first line of the opposite normally-oriented set is traced, the spot again changes direction and another line of the first set is then traced, again the spot changes direction and the second line of such opposite set is then traced, and so forth. In FIGURE 1, one set of parallel lines is indicated generally with the numeral 21 and the opposite set of parallel lines is designated generally with the numeral 22. The set 21 as it is partially shown in FIGURE 1, constitutes four parallel lines which for identification are denoted as 21*a*, 21*b*, 21*c*, and 21*d*. Similarly, the set 22 as illustrated in FIGURE 1 comprises three parallel lines respectively denoted with the numerals 22*a*, 22*b* and 22*c*.

Quite evidently, the crossing sets of lines 21 and 22 intersect at right angles and the normalcy of such intersection is significant in that the intersecting lines define or correspond to a system of rectangular coordinates in which the coordinate axes thereof are the two diagonals respectively extending from the upper left to the lower right and from the lower left to the upper right corner portions of the square-shaped raster configuration shown in FIGURES 1 through 3. Consequently, the origin of such axes is defined by the intersection of the diagonals, which origin is located at the center of the raster.

The lines defining the orthogonal set 21 are equally spaced from each other and, in an identical manner, the lines forming the set 22 are equally spaced. This equality of spacing is also present in all of the parallel sets of lines forming one complete frame as shown in FIGURE 3. The single field illustrated in FIGURE 2 is designated in its entirety with the numeral 23, and in FIGURE 3, the two fields forming the single frame 24 are respectively designated 23*a* and 23*b*.

Figures 4, 5:
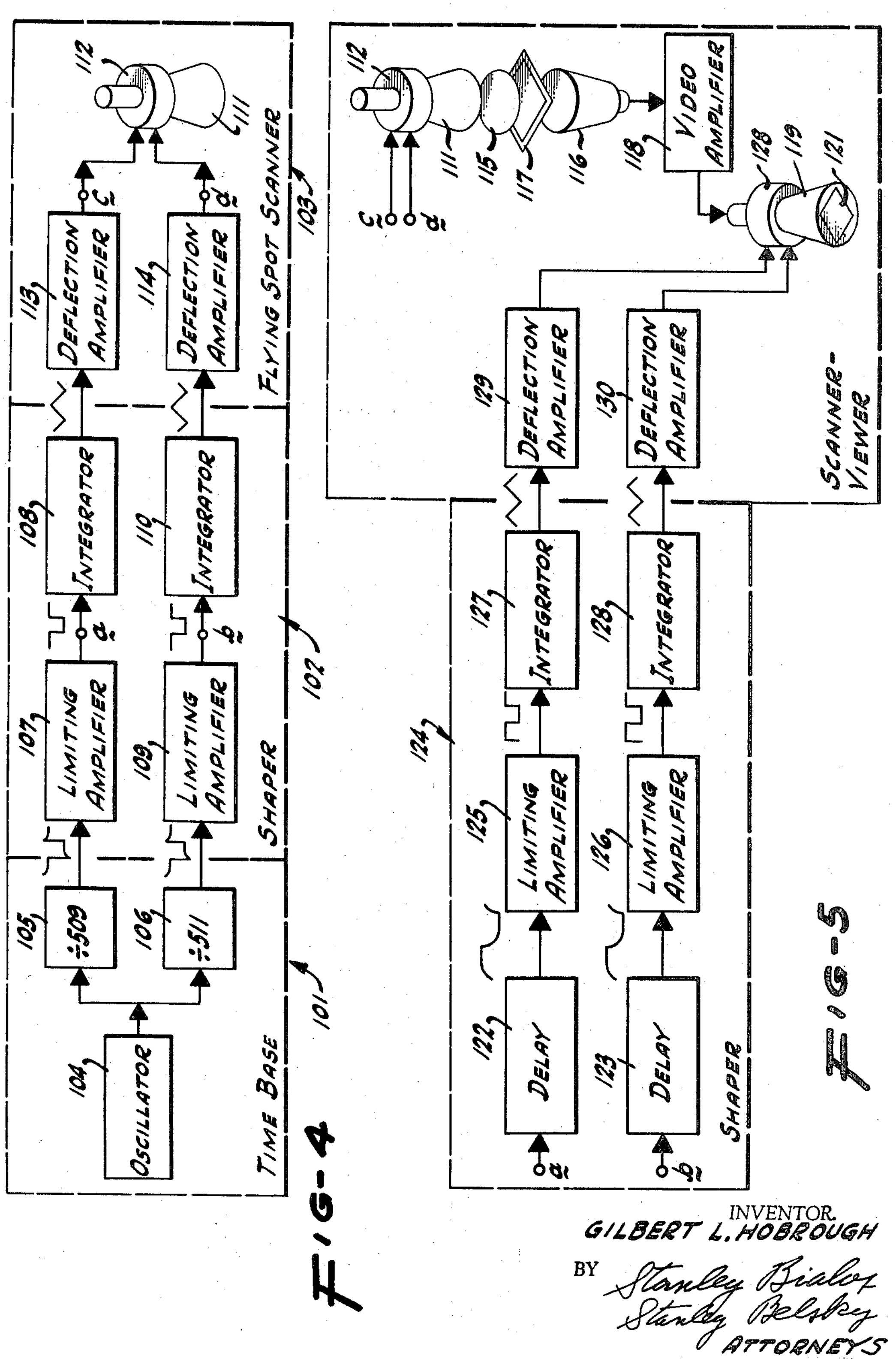
FIGURE 4 is a block diagram illustrating a network for producing a dual diagonal scanning pattern for a flying spot scanner.
FIGURE 5 is a block diagram illustrating the use of the network shown in FIGURE 4 in association with both a flying spot scanner and viewer.

A technique for producing the deflection waveforms requisite for the production of the desired interlaced dual diagonal scan is illustrated in FIGURE 4. This arrangement utilizes a relatively high frequency oscillator and two counting circuits or channels for providing the two signals independently necessary for the deflection axes (hereinafter referred to for convenience as the *x* and *y* deflection axes). With this arrangement, the phase relationship between the *x* and *y* waveforms is rigidly controlled cycle by cycle so that the application of interlace techniques is quite feasible.

In order to achieve single interlace with a crossed diagonal scan of square format, the two counting circuits must divide the oscillator frequency by consecutive odd numbers. With such an arrangement, the number of scanning lines across a picture diagonal from corner to corner (either the *x* or *y* coordinate axis) will be equal to the division ratio of the counting circuits and the frame repetition rate of the pattern will be equal to the oscillator frequency divided by the square of the counting ratio. In the particular circuits illustrated, the division ratios are 509 and 511, thereby giving approximately 510 lines per diagonnal. An oscillator frequency of 7.5 megacycles provides a frame repetition rate of approximately 30 cycles per second with single interlace The circuit embodiment shown in FIGURE 4 includes a time base section 101, a shaper 102 and a flying spot scanner 103. The time base section 101 comprises as oscillator 104 the output of which is coupled to two dividing or counting circuits or channels respectively denoted in general with the numerals 105 and 106. The shaper 102 correspondingly comprises two channels each of which includes a limiting amplifier and an integrator. Thus, the output of the dividing channel 105 feeds into a limiting amplifier 107, the output of which feeds into an integrator 108. Accordingly, the dividing channel 106 feeds a limiting amplifier 109 the output of which is delivered to an integrator 110.

The flying spot scanner 103 includes a cathode ray tube 111 equipped with *x* and *y* deflection systems depicted in FIGURE 4 in the form of a yoke 112. The cathode ray tube and deflection means thereof may be conventional and such means are provided with the required deflection waveforms from conventional deflection amplifiers 113 and 114—the inputs of which are respectively connected to the outputs of the integrators 108 and 110.

The flying spot scanner 103 is shown in FIGURE 4 could be either a part of the optical-electronic scanning system of an automatic registration instrument or the optical-electronic viewing system of such instrument. Actually, the raster generator, which essentially includes the time base 101 and shaper 102, is adapted to provide the deflection waveforms for both the scanning and viewing systems of the automatic registration viewing instrument; and utilization of the raster generator to produce the scanning pattern for both the scanning and viewing systems is illustrated in FIGURE 5.

Thus, if the two points *c* and *d* shown in FIGURE 4, and which constitute the outputs of the deflection amplifiers 113 and 114, are taken to be the same points *c* and *d* shown in FIGURE 5, such points are therefore connected to the deflection system 112 of the cathode ray tube 111 as in FIGURE 4. Such tube 111, then, can be the flying spot scanner of an electronic scanning system which further includes an optical system generally indicated at 115, and a multiplier phototube 116. The object scanned through the optical system 115, which will comprise the usual focusing lenses, is a photographic transparency 117.

The output of the multiplier phototube 116 is connected to the input of a video amplifier 118 which, for purposes of the present invention, may be wholly conventional. The output of the video amplifier 118 constitutes the input of a viewing cathode ray tube 119 which is equipped with a deflection system generally designated by the yoke 120. An electronic-developed reproduction of the image contained in the photographic transparency 117 is provided on the face of the cathode ray tube 119 and for graphic convenience is generally shown as the square-shaped raster 121.

As stated, the deflection system of the viewing cathode ray tube 119 is energized by the raster generator (or at least the time base section thereof) used to energize the deflection system of the scanning cathode ray tube 111. However, it is necesseary to introduce a time delay in the development of the scanning pattern for the viewing cathode ray tube 119 in order that the electronically-produced image appearing on the face of the tube 119 be correlated in a time sense with the scanning of the photographic transparency 117. Accordingly, the outputs of the limiting amplifiers 107 and 109 are indicated in FIGURE 4 by the terminals or points *a* and *b*, and such two points *a* and *b* respectively constitute the inputs to a pair of delay circuits 122 and 123 which form a part of the shaper 124 shown in FIGURE 5. Such shaper 124 also includes a pair of limiting amplifiers 125 and 126 the inputs of which are respectively connected to the delay circuits 122 and 123, and the outputs of which are respectively connected to integrators 127 and 128. The outputs of the integrators are connected to a pair of deflection amplifiers 129 and 130 that feed into the deflection yoke 120 of the cathode viewing ray tube 119.

The limiting amplifiers 107, 109, 125 and 126 are all identical and are operative to provide at the respective outputs thereof a substantially square-shaped voltage waveform as indicated in both FIGURES 4 and 5. In a similar manner the integrators 108, 110, 127 and 128 are all identical and function to provide an output voltage waveform of essentially triangular shape, also as indicated in FIGURES 4 and 5. Further, the delay circuits 122 and 123 are identical and their function is to compensate the viewing cathode ray tube 119 for signal delays that occur in the video amplifier 118 so as to enable the video signal into the viewing cathode ray tube 119 to arrive in time coincidence with the corresponding points on the scanning waveforms being fed into the deflection amplifiers 129 and 130.

Figure 6:
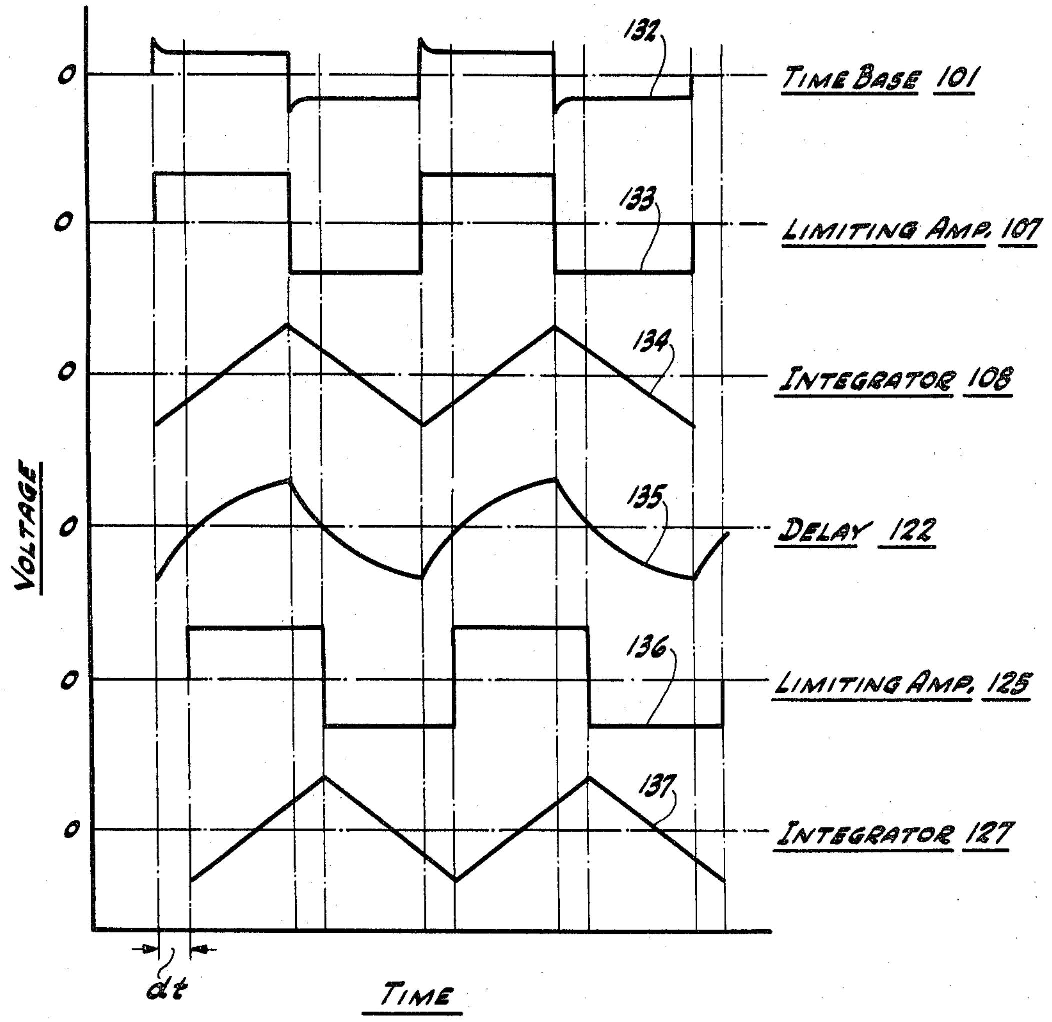
FIGURE 6 is a graph showing a plurality of voltage waveforms plotted against time.

In this same connection, and referring to FIGURE 6 in particular, the output voltage of one of the dividing channels, one of the limiting amplifiers and integrators of both the scanning and viewing systems, and also one of the delay circuits are plotted against time so as to depict not only the shape of the waveforms but also the interrelationship thereof in a time sense. Thus, in FIGURE 6 the vertical axis of the graph represents voltages and the horizontal axis represents time. In this figure, it is seen that the voltage waveform constituting one of the outputs of the time base unit 101 is generally square-shaped and alternates about a zero voltage axis between positive and negative half cycles. For identification, the voltage waveform is designated with the numeral 132 and may constitute the voltage output of either of the counting channels 105 or 106; but for purposes of positive selection, it may be assumed that the waveform 132 is the output of the counting channel 105.

Such output signal is fed to the limiting amplifier 107 which amplifier will cut off the signal at a predetermined level so that the magnitude of the voltage output does not exceed a predetermined value irrespective of the magnitude of the input voltage. Thus, the voltage output of the limiting amplifier 107 may have the general shape and magnitude relative to the waveform 132 shown in FIGURE 6. This output voltage waveform is designated with the numeral 133, and is seen to be essentially in time coincidence with the waveform 132. The integrator 108 is operative to provide a triangularly shaped waveform 134 which is also in time coincidence with the waveforms 132 and 133.

The output of the limiting amplifier 107 in addition to providing the input of the integrator 108 also provides the input of the delay circuit 122. The output waveform of the delay circuit is shown in FIGURE 6 and is denoted with the numeral 135. Such waveform 135 is a significant distortion of the input waveform 133 thereto and as a consequence, the output voltage waveform of the delay circuit must be limited and reshaped before it can be usefully employed. As a result, such output voltage waveform is fed into the limiting amplifier 125 which provides an output voltage waveform 136 substantially identical to the output voltage waveform 133 of the limiting amplifier 107 except that the waveform is delayed slightly—the amount of such delay being represented in FIGURE 6 by the interval *dt*.

The voltage waveform 136, time delayed with respect to the voltage waveform 133, is fed to the integrator 127 which provides an output voltage waveform 137 of triangular shape which is substantially identical to the triangularly shaped output waveform 104 of the integrator 108 except that it is delayed in time with respect thereto by the amount *dt*. Thus, the two voltage waveforms fed to the deflector amplifiers 113 and 129 are substantially identical in shape and in magnitude, but the waveform fed to the deflection amplifier 129 is slightly delayed with respect to the waveform fed into the deflection amplifier 113 by the amount *dt* which is selected to correspond to the delay developed in the video amplifier 118 as between the input signal thereto and the output signal therefrom.

Precisely, the same relationship exists with respect to the channel comprising the elements 106, 109, 110 and 114 and by the channel comprising the elements 106, 109, 123, 126, 128 and 130. Consequently, the triangularly shaped waveform constituting the voltage output waveform of the integrator 128 is substantially the same in both shape and magnitude as the voltage output waveform of the integrator 110 but is delayed in time with respect thereto by the amount *dt*.

Figure 7:
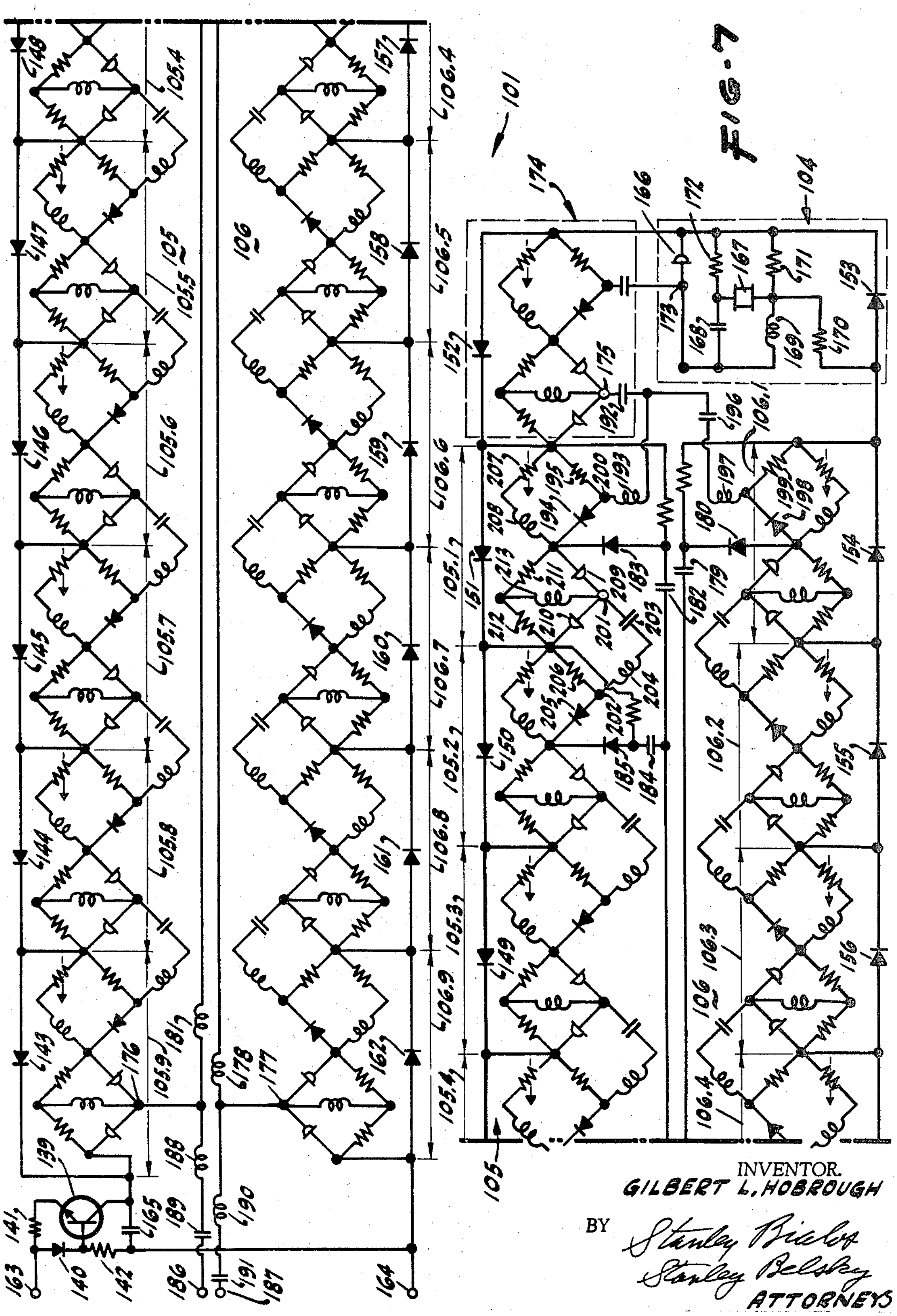
FIGURE 7 is a schematic diagram of the time base circuit shown in FIGURE 4.

The circuit details of the time base section 101 are illustrated in FIGURE 7. Each of the counting circuits or channels 105 and 106 comprises a plurality of series fed or operated flip-flops or bi-stable multi-vibrator stages diode-coupled to each other. An ideal power supply therefor would be a constant current source together with voltage regulators which would make the voltage across each counting stage substantially independent of the voltage across the remaining stages.

In this connection, the time base circuit 101 includes a constant current regulator circuit comprising a transistor 139 and Zener diode 140 together with resistances 141 and 143. The supply voltage of approximately −30 volts D.C. is applied to this circuit in series with a plurality of regulator diodes 143, 144, 145, and so forth, through 162 inclusive. The current regulator circuit is substantially conventional, and accordingly, the value of the current is determined essentially by the voltage drop across the diode 140 and by the voltage drop across the resistance 141. In the present instance, a current of approximately 20 milliamperes has been selected and is attained by using a Zener diode having a voltage drop thereacross of approximately 200 ohms. The supply voltage is applied between the terminals 164 and 163 with the last thereof being at ground potential. The transistor 139 has the usual emitter, base and collector with the base being connected to the junction of the diode 140 and resistance 143, the emitter being connected to the terminal 163 through the resistance 141 which is also connected to the diode 140, and the collector being connected to the resistance 142 through a capacitance 165.

The counting circuits comprised by the time base 101 are arranged in the aforementioned two channels 105 and 106 each of which comprises nine counting stages. Each counting stage is associated with a regulator diode and, therefore, eighteen of the twenty referenced diodes 142 through 162 are arranged with a counting stage. The diodes 152 and 153 are excluded from such group of eighteen in that one thereof is associated with a counting stage common to the two specific channels or groups, and the other thereof is associated with the oscillator 104. In specific terms, the diode 153 is associated with such oscillator and the diode 152 is associated with the counting stage—the output of which is common to the two groups or channels of nine counting stages each. For purposes of identification, the channel 105 comprises the referenced diodes 143 through 151, inclusive, and the channel 106 comprises the referenced diodes 154 through 162, inclusive.

The oscillator 104 may be a substantially conventional tunnel diode crystal oscillator and comprises a tunnel diode 166, a crystal 167, a capacitance 168, an inductance 169 and resistances 170, 171 and 172. In accordance with the specific example heretofore set forth, the oscillator 104 may have an operating frequency of approximately 15 megacycles and an output waveform that is substantially sinusoidal. Such output waveform appears at the terminal 173 which is defined by the common juncture of the capacitance 168, inductance 169 and the anode of the tunnel diode 166.

The terminal 173 as well as providing the output connection for the oscillator 104 defines the input of the aforementioned common counting stage which is generally designated as 174. The counting stage 174 is a flip-flop or bi-stable multi-vibrator and is operative to reduce the frequency of the sinusoidal output waveform delivered thereto from the oscillator and provides an essentially square shaped output waveform of lower frequency at the terminal 175. Again considering the illustrative example, the counting stage 174 divides the oscillator frequency in half and provides at the terminal 175 an essentially square shaped waveform having a frequency of approximately 7.5 megacycles.

Figure 9:
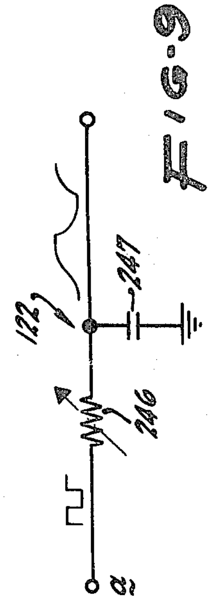
FIGURE 9 is a schematic circuit diagram of a delay circuit used in the shaper shown in FIGURE 5.

This output waveform of the stage 174 is coupled to the dividing channels or circuits 105 and 106; and although such stages have been identified heretofore as respectively corresponding to the regulator diodes 143 through 151, inclusive, and 154 through 162, inclusive, for purposes of simplifying the subsequent description, the respective stages are pictorially differentiated in FIGURE 9 by the dimensional arrows. The nine stages thusly depicted and associated with the channel 105 are denoted with the numerals 105.1 through 105.9, and the stages associated with the channel 106 are similarly identified by the numerals 106.1 through 106.9.

In the specific circuit being considered each of the counting stages divides the input frequency thereto by two. Therefore, the input frequency of 7.5 megacycles fed to the counting stage 105.1 is divided by two and the output frequency of such stage becomes 3.75 megacycles. The output frequency of the next counting stage 105.2 is reduced to 1.875 megacycles, and so on through the final counting stage 105.9 which has an output frequency at its terminal 176 of approximately 15 kilocycles. In a corresponding manner the input frequency to the stage 106.1 is divided by two so that the output frequency thereof is 3.75 megacycles, the output frequency of the counting stage 106.2 is 1.875 megacycles, and so on through the counting stage 106.9 which has an output frequency at its terminal 177 of approximately 15 kilocycles. Evidently, then, the nine counting stages in each of the groups 105 and 106 give a total division through such groups of 512 or $1 \times 2^9$.

In order to provide the required frequency difference between the two outputs of the count down or dividing channels 105 and 106 to obtain the described scanning pattern, a feed back system is employed in association with each of the counting channels. In this connection, the output of the count down group or channel 106 appearing at the terminal 177 is coupled back to the input of the counting stage 106.1 by means of an inductance 178, capacitance 179 and back diode 180. As a result of this feed back network, whenever a negative transition in the generally square shaped waveform appears at the terminal 177, a pulse is fed back to the counter 106.1 as an input pulse thereto. As a consequence of such feed back, only 511 pulses are required from the counting stage 174 in order to provide a complete counting cycle of 512 pulses at the output terminal 177. Therefore, by this feed back means, the counting channel 106 is converted from a group that divides by 512 to a group that divides by 511.

A similar feed back network is provided for the channel or counting group 105 and such network comprises an inductance 181, capacitance 182 and back diode 183. This feed back network functions in the manner heretofore described in connection with the feed back network associated with the channel 106 and thereby converts the channel 105 from a group that divides by 512 to a group that divides by 511. In addition, however, each feed back pulse in the channel 105 is coupled to the counting stage 105.2 thereof by a capacitance 184 and back diode 185—the inductance 181 being common to the two capacitance-diode couplers 182–183 and 184–185. The additional count delivered to the stage 105.2 is equivalent to feeding back two additional pulses to the input of the counting stage 105.1 because two counts from the counting stage 105.1 are required to complete one cycle of operation for the counting stage 105.2. Therefore, by this feed back means the channel 105 is converted from a group that divides by 512 to a group that divides by 509 (i.e., from a 512 to a 511 and then to a 509).

Thus, the output waveforms appearing at the two terminals 186 and 187 of the respective channels 105 and 106 are generally square shaped waveforms (see the waveform 132 shown in FIGURE 6) and differ in frequency by the small precise amount required for the dual diagonal scanning pattern. The waveform appearing at the terminal 176 of the counting stage 105.9 is coupled to the output terminal 186 by an inductance 188 and capacitance 189 in series therewith, and the waveform at the terminal 177 is similarly coupled at the output terminal 187 by a serially related inductance 190 and capacitance 191. The capacitances 189 and 191 are respectively employed to provide D.C. isolation for the output terminals 186 and 187, and the respective inductances 188 and 190 are used to obviate radiation of noise or interference that might otherwise be occasioned by the sharp transients in the output waveforms.

All of the counting stages including the initial stage 174 which is common to the two groups or channels 105 and 106, are substantially identical in terms of both the elements employed therein and the function thereof. Such stages are diode coupled and the common stage 174 is coupled to the channel 105, and in particular the counting stage 105.1 thereof, by means of a capacitance 192 connected in series with the output terminal 175, an inductance 193 connected in series with the capacitance 192, a back diode 194, and a resistance 195, the latter two of which are connected in common to the inductance 193. In a similar manner the counting stage 174 is connected to the first counting stage 106.1 of the channel 106 by a capacitance 196, inductance 197 connected in series therewith, a back diode 198, and a resistance 199. The diode 198 and resistance 199 are connected in common to one end of the inductance 197, and the capacitance 196 is connected in series with the aforementioned capacitance 192.

The juncture of the elements 193, 194 and 195 may be taken to be the input terminal of the counting stage 105.1 and for positive identification is denoted with the numeral 200. The output terminal of such counting stage 105.1 is designated with the numeral 201 and it is seen to be coupled to the input terminal 202 of the second counting stage 105.2 through a serially connected capacitance 203 and inductance 204. As in the case of the counting stage 105.1, a back diode 205 and resistance 206 cooperate with the capacitance 203 and inductance 204 in coupling the two counting stages 105.1 and 105.2. In following the succession of counting stages in each of the channels 105 and 106, it will be evident that the successive stages are similarly connected by a coupling network including a capacitance, inductance, back diode and resistance. As a convenience, the input terminals (200 and 202, for example are indicated in FIGURE 7 by "filled" circles or dots while the output terminals (175 and 201, for example) are indicated by open circles.

Considering the composition of one of the counting stages, 105.1 for example, supply voltage is applied to such stage through the serially connected variable resistance 207 and inductance 208. Adjustment of the resistance 207 permits the voltage across the tunnel diodes 209 and 210 to be tailored for optimum operation of the counting stage. The inductance 193, which comprises a part of the coupling circuit introduces a delay in the signal transmission to the counting stage so as to cause it to operate slightly later in time relative to the operation of the prior stage. The capacitance 192 which also forms a part of the coupling circuit is employed for D.C. isolation and pulse sharpening purposes.

The back diode 194 is operative to reduce the sensitivity of the coupling circuit to reverse polarity pulses from the prior counting stage. Further, its use in the coupling circuit effectively eliminates the sensitivity of the counting stage to input pulses of both polarities thereby making the counting circuit selectively sensitive to input pulses of one polarity only. Which polarity the counting stage responds to depends upon the direction the diode is connected. Thus, the basic tendency of the counting circuit to be sensitive to input pulses of both polarities is obviated.

The resistance 195 is used to establish an appropriate bias on the back diode 194 which behaves similarly to a conventional diode except that its operating voltage is lower by a factor of about 3. Such low operating voltage is necessitated by the low amplitude voltage (0.4 volt peak to peak) provided by the tunnel diode circuits.

The tunnel diode flip-flop counting stage includes a tunnel diode 209 and a tunnel diode 210 connected cathode-to-anode therewith, a resistance 211, a resistance 212 and an inductance 213. These five elements are connected in a bridge circuit with the two tunnel diodes and two resistances respectively comprising the four branches of such bridge. The inductance 213 is connected at one end between the common juncture of the tunnel diodes and at its other end to the juncture of the resistances 211 and 212.

In operation of the counting stage 105.1, a generally square shape waveform at a predetermined frequency is applied to the input terminal 200 thereof. Depending upon the direction in which the diode 104 is connected, the counting stage will be triggered by either the negative going or the positive going portion of the voltage waveform. Such triggering of the flip-flop will cause the same to shift from its initial to its alternate operating condition in which one or the other of the tunnel diodes 209 or 210 is conductive and the other is cut off.

This alternate condition of the flip-flop counting stage will be maintained until the next voltage waveform is applied to the input terminal 200 when the half cycle of appropriate polarity will again trigger the flip-flop counting stage thereby causing the same to return to its prior operating condition.

Thus, the counting stage 105.1 has accomplished a complete cycle of operation and as a consequence, has produced one output voltage waveform at the terminal 201 thereof. However, it has required two input voltage waveforms applied to such terminal 200 to produce a single output voltage waveform and, therefore, the counting stage 105.1 has divided the frequency of the input voltage waveform in half. In the specific example discussed heretofore, the input frequency of the voltage waveform applied to the terminal 200 is 7.5 megacycles and the frequency of the output voltage waveform appearing at the terminal 201 is 3.75 megacycles.

Each of the counting stages functions in exactly the same manner and, therefore, it appears unnecessary to further particularize the duplicated circuit components and operation thereof in the various stages 174, 105.2 through 105.9, and 106.1 through 106.9.

Figure 8:
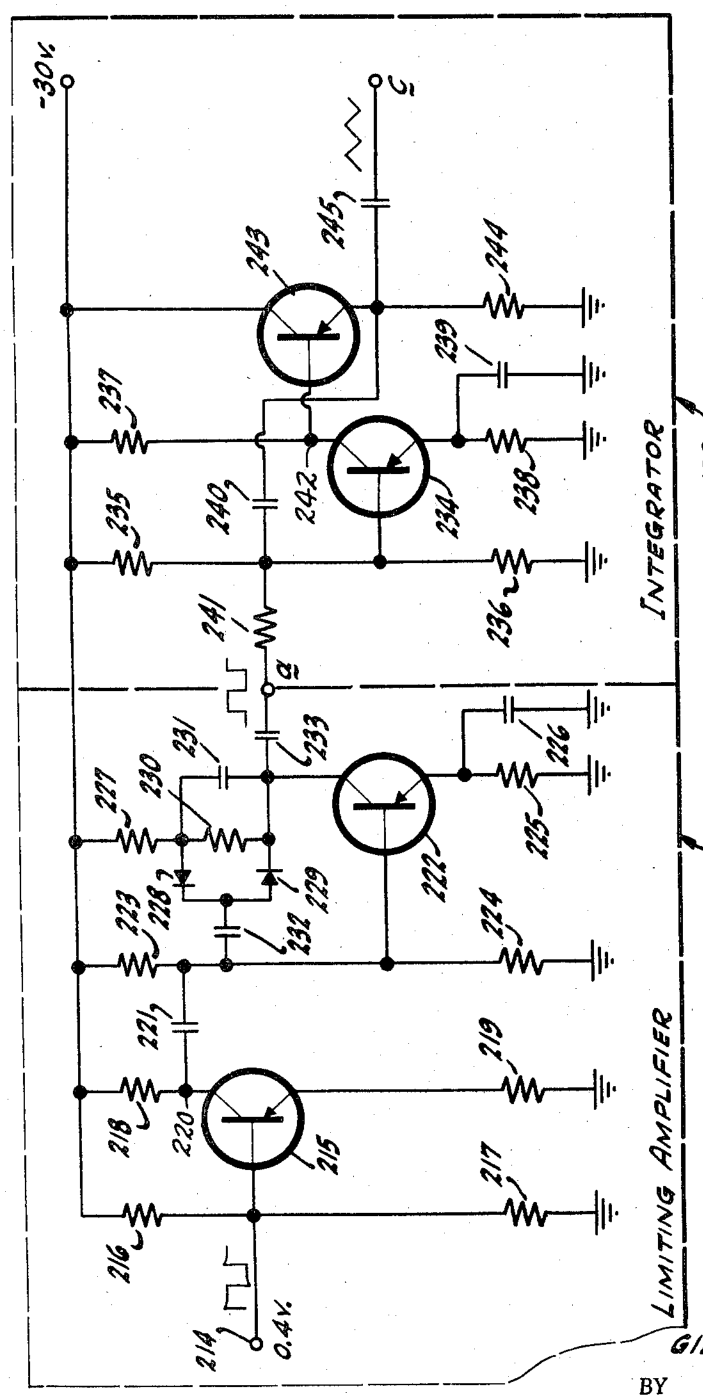
FIGURE 8 is a schematic circuit diagram of a shaper illustrated in block form in FIGURE 4 (and also shown in FIGURE 5)

As stated heretofore, the limiting amplifiers 107, 109, 125 and 126 are all substantially identical as are the integrators 108, 110, 127 and 128. One such limiting amplifier and integrator combination is illustrated in FIGURE 8 and will now be described.

The generally square shaped voltage waveform 132 (shown in FIGURE 6) which constitutes the output of either of the time base counting channels 105 or 106 is applied to the input terminal 214 of the associated limiting amplifier, 107, for example. Such amplifier essentially comprises two stages of amplification, the first of which is defined by the transistor 215 and associated resistances 216, 217, 218, and 219. The resistance 216 connects the base of the transistor to the negative side of a −30 volt D.C. power supply, the resistance 217 connects the base of the transistor to ground, the collector of the transistor is connected to the negative side of such power supply through the resistance 218, and the emitter of the transistor is grounded through resistance 219. The input termi- 214 is connected to the base of the transistor, and the generally square shaped voltage waveform applied to such terminal appears as a current waveform at the point 220 (the collector of the transistor) and constitutes an amplified replica of the input waveform.

A capacitance 221 connected to such point 220 couples such first amplification stage to the subsequent limiting amplifier stage which is effective to modify the waveform of the signal appearing at the point 220. The second stage also includes an amplifier comprising a transistor 222, a resistance 223 connecting the base of the transistor to the negative side of the voltage supply, a resistance 224 connecting such base to ground, a resistance 225 connecting the emitter of the transistor to ground, a capacitance 226 in shunt connection with the resistance 225, and a resistance 227 adapted to connect the collector of the transistor to the negative side of the voltage supply. These elements together comprises an amplifier which would be operative to provide an amplified replica at the output terminal *a* of the waveform appearing at the base of the transistor 222.

However, the circuit also includes a pair of diodes 228 and 229 which are directly connected annode-to-cathode at one of their ends, and the other ends thereof are connected together through a resistance 230. A capacitance 231 is connected in shunt with the resistance 230, and one side of such capacitance is connected to the collector of the transistor 222. The opposite side of the capacitance is connected to the resistance 227. A capacitance 232 connects the juncture of the resistances 223 and 224 and capacitance 221 (i.e., the base of the transistor 222) with the juncture of the diodes 228 and 229. A coupling capacitance 233 connects the collector of the transistor with the terminal *a* and serves to provide D.C. isolation between the transistor 222 and the subsequent integrator circuit.

The diode network comprising the diodes 228 and 229, the resistance 230, and the capacitances 231 and 232 constitute a feedback circuit effective to reduce the amplitude of the voltage at the base of the transistor 222 to a lower value than would be the case in the absence of such diode network. The diodes 228 and 229 are back biased by the voltage developed across the resistance 230 and smoothing capacitance 231 in shunt therewith, and such voltage is determined by the collector current of the transistor 222 which flows through the D.C. circuit defined by the resistances 230 and 227. Since the diodes are back biased by this voltage, they normally present a high impedance and, therefore, isolate the collector circuit of the transistor 222 from the input or base circuit thereof.

However, when the magnitude of the output voltage waveform at point *a* exceeds the value of the back bias across either of the diodes 228 or 229, such diode begins to conduct current which effectively connects the collector of the transistor 222 directly to the base thereof with the result that the amplification of the transistor stage is reduced substantially to zero. In the particular circuit arrangement described, the diode 228 is adapted to become conductive on positive going output voltage swings and the diode 229 is adapted to become conductive on negative going voltage swings.

The capacitance 232 is provided in series with the diode network to block the flow of D.C. current between the collector and the base circuits of the transistor 222. In that D.C. current cannot flow through the capacitance 232, the charge conducted by the diode 228 during positive cycles must be precisely equal to the charge transferred by the diode 229 during negative half cycles. This action results in a symmetrical waveform having equal positive and negative excursions from zero.

The resistance 225 and capacitance 226 bypassing the same serve to bias the base to emitter junction of the transistor 222. Similarly, the resistance 219 serves to bias the input junction of the transistor 215 but is not bypassed so that this first transistor stage provides essentially a constant current generator for the subsequent limiting amplifier stage.

The output voltage waveform of the limiting amplifier 107 has a substantially square shaped configuration as shown most clearly in FIGURE 6 by the waveform 133. This voltage waveform, which is couplied to the terminal *a* by the capacitance 233, is the input signal to the integrator 108. The integrator comprises an amplifier stage which includes a transistor 234, resistances 235, 236, 237 and 238, and capacitances 239 and 240. The voltage waveform appearing at the terminal *a* is connected to the base of the transistor 234 through a resistance 241, and the transistor develops an amplified replica of such input voltage waveform at the collector thereof which, in FIGURE 8, is denoted by the point 242.

The integrator circuit further comprises an emitter-follower amplifier which includes a transistor 243 and a resistance 244 connected in the emitter circuit thereof. The emitter-follower amplifier is operative to produce a current amplification of the input signal appearing at the point 242 and, therefore, provides an amplified replica of such input signal at the output terminal *c* but at a lower impedance level. The output of the transistor 234 is connected to the input of the transistor 243 by the coupling capacitance 240 and the output of the transistor 243 is connected to the terminal *c* by the coupling capacitance 245 which serves to provide D.C. isolation between the output of the transistor 243 and the input of the subsequent circuitry connected to the terminal *c*. The output voltage waveform appearing at the terminal *c* is triangular shaped and constitutes the wave form 134 illustrated in FIGURE 6.

The action of the integrator 108 in producing an integrated waveform at the output terminal *c* from the input voltage waveform at the terminal *a* is best understood if the amplification or gain of the transistors 234 and 243 is considered to be extremely high. Under these conditions, the voltage waveform appearing at the base of the transistor 234 constitutes the input waveform to both of the transistors and will be negligibly small. In specific terms, the voltage waveform at the base of the transistor 234 will be equivalent to the output voltage waveform at the terminal *c* divided by the voltage gain of the transistors 234 and 243. Assuming an amplifier voltage gain in the order of 100, the amplitude of the waveform at the base of the transistor 234 will be approximately 1% of the amplitude of the waveform at the output terminal *c* and, therefore, can be considered negligible for present purposes.

Since the signal level at the base of the transistor 234 is negligibly small, the value of the current flow through the resistance 241 will be essentially equal to the value of the input voltage divided by the value of the resistance 241. In that the resistance 241 and capacitance 240 are connected in series, and because the signal at the midpoint between the resistance and capacitance (that is, at the base of transistor 234) is negligibly small, the value of the currents flowing through the resistance 241 and through the capacitance 240 are essentially equal. Also, since the magnitude of the signal at such midpoint or base of the transistor 234 is negligibly small, the value of the output voltage at the terminal *c* is essentially equal to the voltage developed across the capacitance 240 by virtue of the input current to it.

In that the input voltage at the terminal *a* has a substantially square-shaped waveform, the waveform of the current flow through the resistance 241 will also be substantially square-shaped. Further, the current flow through the capacitance 240 being essentially equal to the value of the current flow through the resistance 241, such flow of current through the capacitance will also be essentially a square-shaped waveform. Because the current flow through the capacitance 240 has a square-shaped waveform, the voltage across the capacitance 240 will have substantially constant positive and negative slopes respectively corresponding to the positive and negative current values through the capacitance. Since the current flow through the capacitance 240 defines the output waveform, the circuit 108 has therefore performed the required integrating function.

As indicated hereinbefore, time delays are inherent in video amplification; and, therefore, again considering the circuit arrangement illustrated in FIGURE 5, the video signal arriving at the intensity electrode of the viewing cathode ray tube 119 will not arrive in time coincidence with the corresponding scan voltage waveforms applied thereto unless special provision is made to assure such time coincidence. The consequence of any such delay or time difference in the arrival of the video signal and the scan voltage waveforms is that the image points appear on the face of the viewing tube 119 will be displaced from their proper position, and such displacement will result in the presentation of four separate images respectively corresponding to the four directions of scan, each displaced from its proper location by the same distance.

Such undesirable displacement can be obviated by introducing a delay in the time of arrival at the viewing cathode ray tube 119 of the scanning waveforms relative to the application to the scanning cathode ray tube 111 of the scanning waveforms therefor. The delay must be made equal to the delay that occurs in the video amplifier 118 so that the video signal delivered to the intensity electrode of the viewing cathode ray tube 119 will arrive in time coincidence with the corresponding points on the scanning waveforms applied to the deflection system of such viewing tube. In FIGURE 5 such time delay is provided by the delay means 122 and 123, which may be identical.

A typical delay circuit comprising the means 122 and 123 is shown in FIGURE 9, and includes a resistance 246 and capacitance 247. The resistance is connected in series between the input terminal *a* (considering the delay means 122) to the delay circuit and the input to the following limiter-amplifier stage which, in the particular illustration, is the limiting amplifier 125. The capacitance 247 is connected between the output side of the resistance and ground. The resistance 246 is made variable, and thereby serves to afford adjustment of the amount of delay introduced by the circuit. In a typical instance, the delay interval *dt* may be in the order of about 0.15 microseconds.

As shown best in FIGURE 6, the circuit 122 in addition to providing the desirable delay in the transmission therethrough of the applied square-shaped waveform 133 introduces an undesirable rounding of the leading edges of such waveform, as shown by the waveform 135. It is necessary, therefore, that an additional limiting amplifier be used after the delay circuit to reestablish the square-shaped waveform, and this is accomplished by inclusion of the limiting amplifiers 125 and 126 in the circuit arrangement of FIGURE 5. Evidently, by proper adjustment of each delay circuit, as by means of the variable resistance 246 therein, the scanning voltage waveforms and the video signal are made to arrive at the viewing cathode ray tube 119 in time coincidence.

The time base circuit 101 together with the shaper 102 (and 124) provide two triangular waveforms at the outputs of the integrators 108 and 110 that differ by a small but precise frequency. These waveforms when applied to a conventional cathode ray tube deflection system produce a square-shaped raster with diagonal line scanning. The small but precise frequency difference between the two triangular waveforms is maintained at a constant value by virtue of the precise frequency division that occurs in each of the channels 105 and 106; and by utilizing adjacent or successive odd numbers in the frequency division, a single (i.e., two fields per frame) interlace of the scanning lines is obtained.

The position and direction of the trace at any instant depends upon the momentary phase relationship of the two time base signals respectively applied to the deflection system of the cathode ray tube. As brought out hereinbefore, the two time base signals are voltage waveforms of triangular shape, as shown at 134 in FIGURE 6 considering the cathode ray tube 111, and shown at 137 considering the cathode ray tube 119. Various phase relationships and the respectively corresponding orientation of the trace on the face of the cathode ray tube are shown in FIGURES 10*a* through 10*h*, to which reference will now be made.

In this group of figures, the two associated voltage waveforms are illustratively depicted in various phase relationships in the graphs that comprise a part of each of FIGURES 10*a* through 10*h*, and which are correspondingly designated 248*a* through 248*h*. Each of the graphs 248 is divided into equal increments by a plurality of vertical lines, the spacings between which represent 45° in terms of the phase relationship between the two waveforms. For purposes of identification in each of the graphs 248, the upper triangularly-shaped waveform is designated 134*x* and the lower triangularly-shaped waveform is designated 134*y*. By comparing the waveform 134*y* in each of the graphs 248*a* through 248*h*, it will be noted that it occupies the same position in each graph and alternates between positive and negative half-cycles about a reference axis.

Similarly, the waveform 134*x* alternates between positive and negative half-cycles about a reference axis, but the phase thereof is continuously changing relative to the waveform 134*y*. In graph 248*a*, the instantaneous phase relationship of the triangularly-shaped voltage waveforms 134*x* and 134*y* is one of coincidence, and the spot is moving in one direction or the other to trace the path 249 which is diagonally oriented and extends from the lower left-hand corner to the upper right-hand corner of the raster. The alternate directions of movement of the spot in tracing the path 249 are indicated by the oppositely-facing arrows therealong.

At the instant that the phase relationship has changed to one in which the waveform 134$x$ leads the waveform 134$y$ by 45°, the path then being traced by the moving spot is designated in FIGURE 10$b$ with the numeral 250, and progresses in the direction indicated by the arrows. Subsequently, the phase relationship between the waveforms 134$x$ and 134$y$ is one in which the waveform 134$x$ leads by 90°, as shown in FIGURE 10$c$. The corresponding path traced by the moving spot is denoted 251 in this figure, and develops in the direction of the arrows positioned therealong. At yet a subsequent time at which the waveform 134$x$ leads the waveform 134$y$ by 135° as illustrated in FIGURE 10$d$, the corresponding path 252 being traced by the spot has the illustrated orientation in such figure and the spot is moving in the direction of the arrows.

At the time that the waveform 134$x$ has shifted to a position in which it leads the waveform 134$y$ by 180°, the path then being traced by the moving spot has a straight-line configuration, as shown at 253 in FIGURE 10$e$, and extends from the upper left-hand to the lower right-hand corner of the raster pattern. The precise direction of movement can be in either direction, as indicated by the arrows. At the time that the waveform 134$x$ leads the waveform 134$y$ by 225°, as shown in FIGURE 10$f$, the path described by the spot has the illustrated orientation and is designated with the numeral 254. The direction of movement of the trace is as indicated by the arrows along such path. It should be noted that the orientation of the paths 252 and 254 are substantially the same except that the direction of movement of the scanning spot is opposite as between these two paths. In that the paths are substantially coincident, it will be evident that each spot along such path will be traversed twice by the scanning spot once in each direction.

FIGURE 10$g$ illustrates the case in which the waveform 134$x$ leads the waveform 134$y$ by 270°, and the corresponding path then traversed by the moving spot is designated with the numeral 255 and the direction of movement of the spot is indicated by the arrows therealong. By comparing FIGURE 10$g$ with FIGURE 10$c$, it is seen that the described paths 251 and 255 are substantially coincident but that the direction in which the spot is moving to trace the path 255 is opposite to its direction in tracing the path 251. At the time that the waveform 134$x$ is leading the waveform 134$y$ by 315°, the path 256 then being traced by the spot has the orientation illustrated in FIGURE 10$h$, and the direction of movement of the spot is shown by the arrows. A comparison of FIGURE 10$h$ with FIGURE 10$b$ indicates that the paths 250 and 256 are substantially coincident, and that the spot is moving in opposite directions in describing these two paths. Thus, any point along such paths is traversed twice but in opposite directions by the spot in tracing the two paths 250 and 256. Clearly then, and taking the case of a point that lies on the paths 250 and 256, and also lies along the paths 252 and 254, such point will be traversed four times by the spot—twice in opposite directions along one orthogonal axis and twice in opposite directions along the other orthogonal axis. Considering all of the various paths traversed by the spot in defining the dual diagonal scanning raster, every image point lying within such raster is traversed four times in opposite directions along each pair of orthogonal axes.

At the time that the waveform 134$x$ leads the waveform 134$y$ by 360°, the condition illustrated in FIGURE 10$a$ is again assumed, and one entire field 23 (FIGURE 2) has been completed and the next successive field will be an interlace therewith to define the frame 24 shown in FIGURE 3. The entire cycle of operation will then be repeated.

The scanning pattern, which is characterized by a 45° interlace extremely accurately spaced, is useful in any situation where the normal horizontal lines which appear on a TV-type scanning raster are objectionable as, for example, in electronic viewers for electronic displays of photo reconnaissance photography. The described dual diagonal scanning raster eliminates this objection to horizontal scanning lines. The scanning raster is also useful wherever a video signal is to be modified electronically to produce edge enhancement in the viewed image. More particularly, in the case of a conventional TV raster, filtering or edge enhancement effects appear on one side of the line to be enhanced. Further, lines lying parallel to the scanning direction are not subject to enhancement. Using the diagonal scanning technique, however, all points in the image are scanned in four directions so that enhancement is supplied to all edges regardless of the direction of the scanning area, and the enhanced effects appear equal on each side of the line or point.

The circuit arrangement illustrated in FIGURES 4 and 5 could be used for the remote viewing of photographs. In such case, the scanning cathode ray tube 111 should be of a type having a short persistence phosphor face, and the raster image traced on the face of the tube is projected by the optical system 115 onto the photograph 117 to the viewed remotely. Light passing through the photograph is collected by a photoelectric device (possibly through optical collection lenses, not shown) such as a multiplier phototube which, by way of example, may be an RCA No. 6655A.

The signal from such photoelectric device 116 is amplified by the video amplifier 118, and the amplified signal is applied to the remotely located viewing cathode ray tube 119. The diagonal scanning raster is produced on the faces of both the scanning and viewing cathode ray tubes by applying the two triangular waveforms from the integrator circuits to the deflection systems of the cathode ray tubes, as previously described. Usually, such triangular waveforms are applied through deflection amplifiers, as illustrated in FIGURES 4 and 5, to raise the signal level to a value suitable for deflection purposes. Such deflection amplifiers may be of conventional design, and the amplifier-deflection coil units known as Celco Model KY521S600 can be used.

For purposes of presenting a specific example of component values in typical illustrative circuits, the following may be considered:

The circuit shown in FIGURE 7:

| | | |
|---|---|---|
| Transistor **139** | | 2N718 |
| Diode **140** | 5.6-volt Zener | 1N752 |
| Resistance **141** | ohms | 220 |
| Resistance **142** | do | 3.3K |
| Diodes **143–162**, incl. | | G129 |
| Capacitance **165** | picofarads | 1.0 |
| Tunnel diode **166** | | 1N3712 |
| Crystal **167** | megacycles | 15 |
| Capacitance **168** | picofarads | 150 |
| Inductance **169** | microhenries | 0.68 |
| Resistance **170** | ohms | 39 |
| Resistance **171** | do | 82 |
| Resistance **172** | do | 100 |
| Inductance **178** | microhenries | 1.0 |
| Capacitance **179** | picofarads | 47 |
| Diode **180** | | BD3 |
| Inductance **181** | microhenries | 1.0 |
| Capacitance **182** | picofarads | 100 |
| Diode **183** | | BD3 |
| Capacitance **184** | picofarads | 100 |
| Diode **185** | | BD3 |
| Inductance **188** | microhenries | 10 |
| Capacitance **189** | picofarads | .022 |
| Inductance **190** | microhenries | 10 |
| Capacitance **191** | picofardas | .022 |
| Capacitance **192** | picofarads | 100 |
| Inductance **193** | microhenries | .47 |
| Diode **194** | | BD3 |
| Resistance **195** | ohms | 1.0K |

| | | |
|---|---|---|
| Capacitance **196** | picofarads | 470 |
| Inductance **197** | microhenries | .47 |
| Diode **198** | | BD3 |
| Resistance **199** | ohms | 1.0K |
| Capacitance **203** | picofarads | 100 |
| Inductance **204** | microhenries | 1.0 |
| Diode **205** | | BD3 |
| Resistance **206** | ohms | 1.0K |
| Resistance **207** | ohms, variable | 0–100 |
| Inductance **208** | microhenries | 2.2 |
| Tunnel diode **209** | | 1N3717 |
| Tunnel diode **210** | | 1N3717 |
| Resistance **211** | ohms | 100 |
| Resistance **212** | do | 100 |
| Inductance **213** | microhenries | .68 |
| Supply voltage | | [1]—30 volts DC |

[1] Applied between terminals 163 and 164, the last of which is grounded.

The circuit shown in FIGURE 10:

| | | |
|---|---|---|
| Transistor **215** | | 2N2189 |
| Transistor **222** | | 2N2189 |
| Transistor **234** | | 2N2189 |
| Transistor **243** | | 2N2189 |
| Diode **228** | | 1N198 |
| Diode **229** | | 1N198 |
| Resistance **216** | ohms | 150K |
| Resistance **217** | do | 10.0K |
| Resistance **218** | do | 10.0K |
| Resistance **219** | do | 1.0K |
| Resistance **223** | do | 39.0K |
| Resistance **224** | do | 2.2K |
| Resistance **225** | do | 220 |
| Resistance **227** | do | 2.2K |
| Resistance **230** | do | 1.8K |
| Resistance **235** | do | 120 |
| Resistance **236** | do | 10.0K |
| Resistance **237** | do | 6.8K |
| Resistance **238** | do | 1.0K |
| Resistance **241** | do | 10.0K |
| Resistance **244** | do | 2.2K |
| Capacitance **221** | microfarads | .01 |
| Capacitance **226** | do | 3.3 |
| Capacitance **231** | do | 1.0 |
| Capacitance **232** | do | 1.0 |
| Capacitance **233** | do | 0.1 |
| Capacitance **239** | do | 1.0 |
| Capacitance **240** | do | 0.001 |
| Capacitance **245** | do | 1.0 |

The circuit shown in FIGURE 11:

| | | |
|---|---|---|
| Resistance **246** | ohms, variable | 15K |
| Capacitance **247** | micromicrofarads | 150 |

It should be appreciated that the specific circuit values set forth imply no criticality and can be varied greatly depending upon internal and external parameters, the choice of transistors, the specific function intended for the circuit in any environmental setting, etc.

While in the foregoing specification embodiments of the invention have been set forth in considerable detail for purposes of making an adequate disclosure thereof, it will be appreciated by those skilled in the art that numerous changes may be made in such details without departing from the spirit and principles of the invention.

What is claimed is:

1. In combination:

(a) a flying spot scanner for scanning indicia having an optical image thereon;

(b) a photocell optically co-acting with said indicia for producing a video signal indicative of said indicia being scanned;

(c) a viewing cathode ray tube having deflection circuitry for deflecting the electron beam produced therein;

(d) means for coupling said photocell to the beam intensity control electrode of said viewing cathode ray tube;

(e) a raster generator coupled to the deflection system of each of said tubes for developing on the faces thereof a dual diagonal scanning raster comprising crossed sets of orthogonal lines, said raster generator including a time base section comprising frequency generating means for developing a signal having a frequency approximating a predetermined value and including also at least two count-down channels for effectively dividing such signal into at least two signals having different frequencies respectively representing the $x$ and $y$ scanning signals for the deflection systems of said cathode ray tubes, said count-down channels being operative to maintain a fixed-frequency relationship between such two signals representing the $x$ and $y$ scanning signals such that the aforesaid dual diagonal scanning raster is developed; and (f) delay means coupled between said count-down channels of said generator and the deflection circuitry of said viewing tube for preventing undesirable displacements of portions of the viewed image produced by said viewing tube.

2. The system of claim 1 in which said countdown channels effectively divide the frequency of the signal from said frequency generating means by successive odd numbers.

References Cited

UNITED STATES PATENTS

| | | | |
|---|---|---|---|
| 2,717,329 | 9/1955 | Jones et al. | 315—24 |
| 2,817,787 | 12/1957 | Kovasznay | 315—24 |
| 3,112,452 | 11/1963 | Kirkpatrick | 328—167 |

ROBERT L. GRIFFIN, *Primary Examiner.*

R. L. RICHARDSON, *Assistant Examiner.*

U.S. Cl. X.R.

178—7.7; 315—19, 23, 24